April 18, 1944.  A. C. HOUGHTON  2,347,053
PROCESS FOR PURIFYING CRUDE SODIUM CARBONATE
Filed Feb. 7, 1940  2 Sheets-Sheet 2
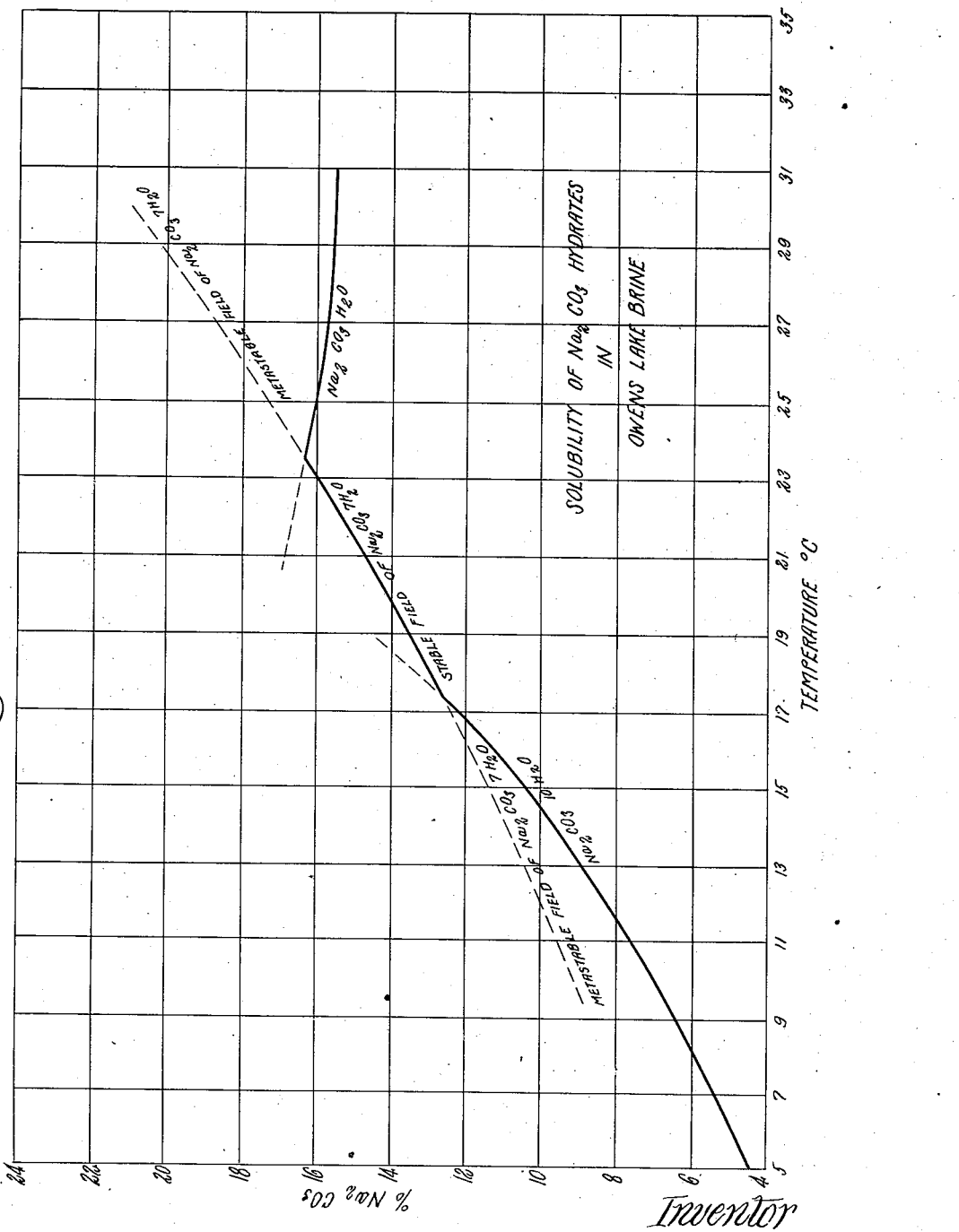

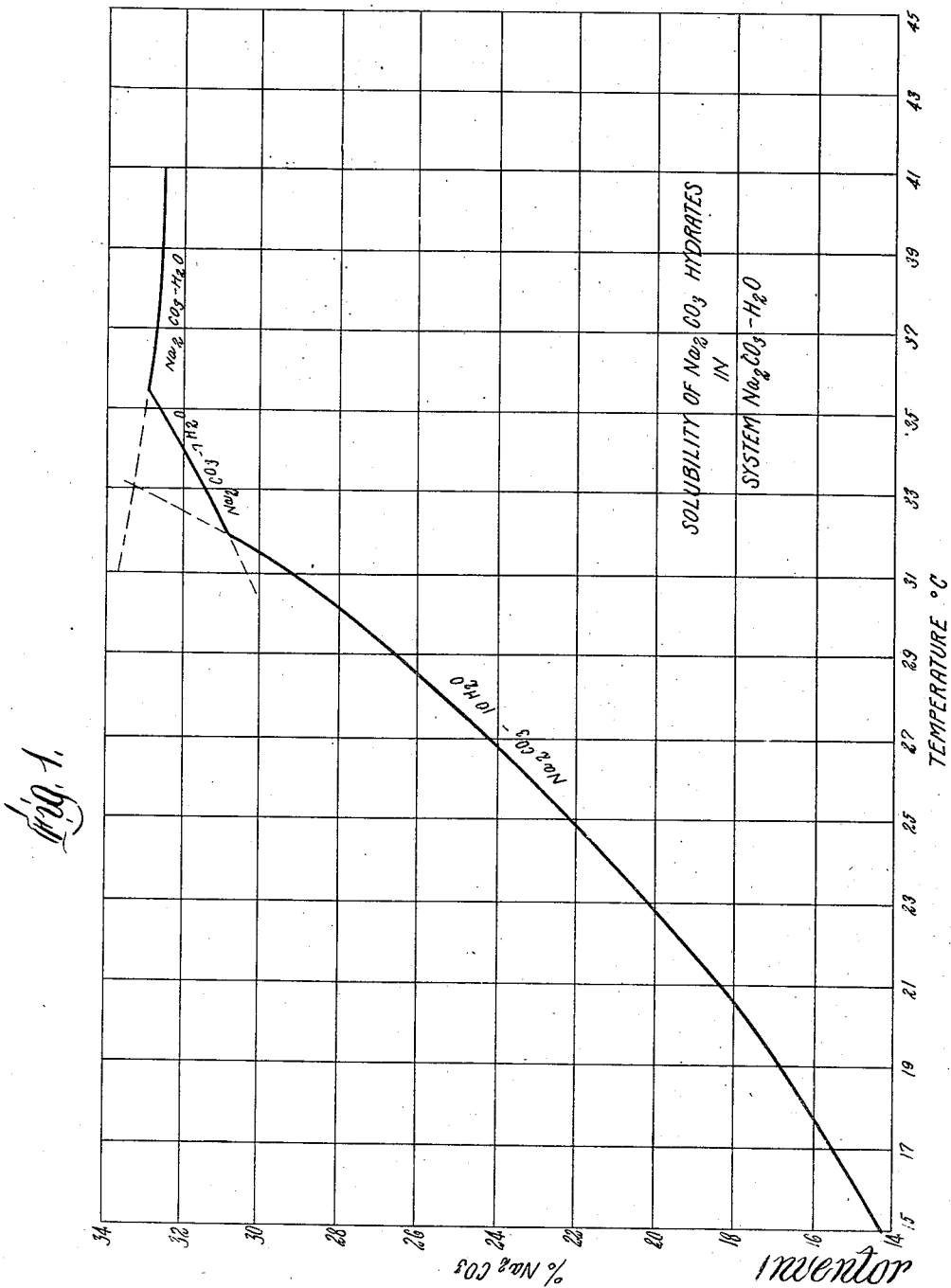

Patented Apr. 18, 1944

2,347,053

UNITED STATES PATENT OFFICE 2,347,053

PROCESS FOR PURIFYING CRUDE SODIUM CARBONATE

Alexis C. Houghton, Bartlett, Calif., assignor to Frederic A. Dakin, Boston, Mass., as trustee Application February 7, 1940, Serial No. 317,638

5 Claims. (Cl. 23—63)

This invention relates to an improved process for obtaining commercially pure sodium carbonate from various raw materials containing sodium carbonate and other salts, such as are obtainable in commercial quantities from Owens Lake, California, and other similar alkali lakes.

This application is a continuation-in-part of my co-pending U. S. patent application Serial No. 73,498, filed April 9, 1936, pursuant to which Letters Patent No. 2,193,817 were granted to me on March 19, 1940, in which I have mentioned the fact that it is impossible to crystallize pure sodium carbonate decahydrate from solutions containing both sodium carbonate and sodium sulphate, as the decahydrates of both these salts form a series of mixed crystals with each other, as they both crystallize in the same system—the monoclinic. As sodium sulphate is always present in Owens Lake brines, it is therefore impossible to make pure sodium carbonate from such brines by one crystallization of sodium carbonate decahydrate. However, as $Na_2CO_3.7H_2O$ crystallizes in the rhombic system and therefore in an entirely different form to that of

$Na_2SO_4.10H_2O$ the sodium carbonate heptahydrate does not form mixed crystals or solid solutions of $Na_2SO_4.10H_2O$, therefore under proper conditions of concentration and temperature it may be crystallized in a pure state from solutions containing both sodium carbonate and sodium sulphate.

Also in the aforementioned co-pending application, I have described an invention whereby existing natural brines of Owens Lake, which never have a sodium carbonate content of more than from 16.5% to 17% $Na_2CO_3$, can be strengthened up to a sodium carbonate content of from 19% to 21% $Na_2CO_3$, while being fully saturated with sodium chloride, and then by cooling such brine to a temperature not lower than 10° C. into the field of metastable saturation with respect to sodium carbonate heptahydrate, a long cooling range can be obtained during which a large crop of pure sodium carbonate heptahydrate free from crystallized sodium sulphate or any other crystallized impurities can be crystallized out in a yield of some 70% of the sodium carbonate content of the brine.

While the invention claimed in the above-mentioned application relates to a process of crystallizing a crop of pure sodium carbonate heptahydrate from a clear solution, the present invention relates to a method of transforming, under certain conditions to be described, large amounts of the solid crystalline form of sodium carbonate, such as the decahydrate or monohydrate, directly into crystals of pure sodium carbonate heptahydrate, without starting with or at any time having a clear solution, but always having a suspension of a large excess of crystalline material in a minimum amount of a liquid medium. The advantage of such a method is greater simplicity of operation, smaller volume of mixtures or solutions to handle, and economy in thermal energy requirements by avoiding the necessity of artificial refrigeration to cool a solution to 10° C. and to offset the considerable amount of heat of crystallization from a solution, as will be explained more fully later.

The present invention also relates to a method of recovering pure sodium carbonate from sulphate-containing sodium carbonate by adding to a suitable brine, under conditions to be described, large quantities of a highly concentrated solution of sulphate-containing sodium carbonate so as to crystallize therefrom pure sodium carbonate heptahydrate.

The principles of this invention will be better understood by reference to the drawings of which Figure 1 shows curves of solubility of the three hydrates of sodium carbonate.

Figure 2 shows curves of the solubility of the three hydrates of sodium carbonate in Owens Lake brines saturated or substantially saturated (within 2% or 3%) with sodium chloride.

The dotted extensions of the curves of the different hydrates beyond the transition points indicate the extents to which the solubilities of the individual hydrates have been investigated into the metastable regions.

The transition point of the decahydrate to heptahydrate in a brine saturated or substantially saturated with sodium chloride, is at a temperature of about 17.5° C. at a concentration of 12.8% $Na_2CO_3$ in the solution, and the transition point of the heptahydrate to monohydrate is at a temperature of about 23.6° C. at a concentration of 16.3% $Na_2CO_3$. The stable field of the heptahydrate in saturated sodium chloride solutions is therefore seen to be within a temperature range of about 6° C. between the concentrations of sodium carbonate in solution as given.

At 17.5° C., the transition point of decahydrate to heptahydrate, it will be seen from the dotted extension of the $Na_2CO_3.10H_2O$ curve to the immediate right into the metastable field of supersaturation, that in Owens Lake brine or saturated sodium chloride solutions, the solubility of $Na_2CO_3.10H_2O$ is greater than the solubility of $Na_2CO_3.7H_2O$ in the stable field of this latter salt at the same temperature. If therefore crystals of $Na_2CO_3.10H_2O$ are suspended in a brine containing from 12.8% to 16.3% $Na_2CO_3$ substantially saturated with sodium chloride, and the temperature of the mixture maintained between 17.5° C. and 23.6° C., the crystals of $Na_2CO_3.10H_2O$ being more soluble under these conditions than those of $Na_2CO_3.7H_2O$, will dissolve, but will immediately crystallize out again as the more stable form $Na_2CO_3.7H_2O$. This transformation of crystalline decahydrate directly to crystalline heptahydrate will continue as long as decahydrate is added and the conditions of temperature and saturation in sodium chloride is maintained. The only limit to the amount of decahydrate crystals so added in relation to the amount of suspending brine used for the transformation, is the thickness of the resulting mixture. This should not be either so thin or so thick that it will not handle well on a filter or centrifuge, or too thick for effectual control of the temperature limits by agitation. Also as three molecules of water of crystallization are split off from the decahydrate in this transformation and go into the mother liquor, thus diluting its sodium chloride content, enough solid sodium chloride must be added to the mixture to maintain saturation in this constituent, but not an excess thereof such as would remain undissolved and contaminate the purity of the heptahydrate crystals when the mother liquor is washed out. A high percentage of conversion of decahydrate to heptahydrate is obtained in this process, as starting with a solution saturated with $Na_2CO_3$ and NaCl between the temperatures 17.5° C. and 23.6° C. with saturation in sodium chloride being maintained, the mother liquor at the end of the transformation will still have the same composition in sodium carbonate and sodium chloride as at the start. The only loss of sodium carbonate as crystal will be due to the transfer of three molecules of water of crystallization from the decahydrate to the mother liquor, which must be saturated with sodium carbonate at the expense of the decahydrate added. Also any mechanical moisture present in the decahydrate crystals will dilute the mother liquor and must be saturated with $Na_2CO_3$ at the expense of the decahydrate. It is therefore desirable to have the decahydrate as free from mechanical moisture as possible.

Having described the principles underlying this invention, I will now describe how the process may be carried out most advantageously in commercial operation.

Since the withdrawal of water from the Owens River to supply the city of Los Angeles aqueduct system, the normal conditions of Owens Lake for the last fifteen years has been that of a salt body permeated with a saturated brine. The composition of this saturated brine is a function of the temperature, in winter being low in sodium carbonate and relatively high in sodium sulphate, while in the hot summer months of July, August and September it has a maximum sodium carbonate and a minimum sodium sulphate content. The wide variation in sodium sulphate of from around 6% $Na_2SO_4$ in winter to a minimum of 1.8% $Na_2SO_4$ in summer is brought about by the fact that at higher temperatures the double salt $Na_2CO_3.2Na_2SO_4$, commonly known as burkeite, is more or less insoluble in the saturated sodium carbonate sodium chloride brine of the lake and so is precipitated out in the hot summer months, thus reducing the amount of sodium sulphate in solution, while in winter tempertaure this double salt is not stable and falls apart into its constituents $Na_2CO_3$ and $Na_2SO_4$, thus increasing the amount of sodium sulphate in solution in the brine in winter.

During the hot summer months of July, August and September, the normal surface brine of Owens Lake, which may be pumped to the plant in any desired quantity, has approximately the composition:

| | Per cent |
|---|---|
| $Na_2CO_3$ | 15.0–16.5 |
| $Na_2SO_4$ | 1.8– 2.0 |
| NaCl | 14.0–15.0 |

As described in U. S. Letters Patent No. 1,853,275, issued to Houghton and Miller, large storage vats near the plant are filled with brine from the lake of approximately the above composition, enough brine being pumped into these vats to provide a supply of soda sufficient for one year or more at the contemplated daily rate of production. This brine is allowed to stand in the vats until the advent of cold weather in December and January, when it becomes chilled to a temperature of 8° C. or less, thereby crystallizing out a large crop of crude sodium carbonate decahydrate, which contains also sodium sulphate decahydrate as mixed crystal with the carbonate decahydrate. The mother liquor is then drained away from the decahydrate crystals by means of drain pipes provided in the vats, and a bed of several feet in thickness of crude carbonate decahydrate obtained having the approximate composition:

| | Per cent |
|---|---|
| $Na_2CO_3$ | 33.0 |
| $Na_2SO_4$ | 1.2 |
| $Na_2B_2O_4$ | 0.5 |
| NaCl | 2.0 |
| $H_2O$ | 63.3 |
| | 100.0 |

70% or more of the sodium carbonate contained in the brine originally placed in the vats is obtained as decahydrate of approximately the above composition. This crude decahydrate is then trucked or otherwise conveyed to the plant for purification by re-crystallizing as the heptahydrate.

A specific example of the re-crystallization of this crude decahydrate to pure heptahydrate, using the principles of this invention, will now be given. 1000 lbs. of the crude decahydrate of the above approximate composition is mixed with 750 lbs. of a lake brine containing approximately 14% $Na_2CO_3$, 2.5% $Na_2SO_4$, and 15% NaCl, in a vessel provided with an efficient agitator for stirring the mixture, and the temperature maintained by suitable means within the range of 17.5° to 23.6° C. There is also added to this mixture 38 lbs. of solid sodium chloride to maintain saturation of NaCl in the mother liquor. There is an immediate conversion of the decahydrate crystals to heptahydrate crystals. The heptahydrate crystals at first formed are very small, and therefore the agitation and temperature control is continued for a sufficient length of time for the crystals to build up to a size suitable for efficient centrifuging and washing free from mother liquor. The mixture now consists of a suspension of mother liquor and pure sodium carbonate heptahydrate crystals, the sodium sulphate of the mixed crystal decahydrates having been released to the mother liquor. I have found that a period of two hours is a sufficient length of time to build up the heptahydrate crystals to a suitable size. The heptahydrate crystals are removed by centrifuging or other method, and washed free from mother liquor with water. 650 lbs. of crystals are obtained analyzing approximately:

|  | Per cent |
|---|---|
| $Na_2CO_3.7H_2O$ | 95.0 |
| Mother liquor impurities | .15 |
| Moisture | 4.85 |
|  | 100.00 |

I have found that a temperature of 18° to 20° C. is a convenient one to use for this conversion. If a temperature of 18° C. has been used, the mother liquor from the heptahydrate crystals will have approximately the following composition in the above example.

|  | Per cent |
|---|---|
| $Na_2CO_3$ | 13.0 |
| $Na_2SO_4$ | 2.7 |
| $NaCl$ | 15.0 |

This mother liquor has increased slightly in sodium sulphate content due to the mixed crystal sulphate of the original decahydrate going into solution. The mother liquor may, however, be used over again as the suspending brine for converting more decahydrate to heptahydrate, and the operation repeated as many times as possible without using fresh suspending brine until the sodium sulphate content has increased up to around 6% $Na_2SO_4$ in the mother liquor, at which point there will be danger of Glauber's salt, $Na_2SO_4.10H_2O$, crystallizing out as such with the heptahydrate when cooled to the temperature used for the conversion. At this point therefore the mother liquor must be discarded, and fresh suspending brine of suitable composition used.

As illustrating the economy in thermal energy requirements for cooling in this direct conversion of crystalline decahydrate to crystalline heptahydrate, to crystallize out one ton of sodium carbonate as heptahydrate by cooling a clear 21% $Na_2CO_3$ brine from 31° C. to 10° C., as in my previously mentioned invention, it will be necessary to remove the following amounts of heat by cooling water and artificial refrigeration.

|  | B. t. u. |
|---|---|
| Cooling 13,750 lbs. brine from 31° to 10° C | 441,790 |
| Crystallizing 2,000 lbs. $Na_2CO_3$ as $Na_2CO_3.7H_2O$ | 385,000 |
| Total heat to be removed | 826,790 |

Equivalent refrigeration, 2.87 tons.

In the direct conversion method, however, as in the specific example described, no heat has to be removed, but there is instead an actual absorption of heat, with consequent self-cooling. For instance, the heat of crystallization of sodium carbonate decahydrate is 273.3 B. t. u. per pound of sodium carbonate crystallized. When sodium carbonate decahydrate is crystallized from a solution, this amount of heat is evolved; conversely, when crystallized sodium carbonate decahydrate is dissolved, this amount of heat is absorbed. The heat of crystallization of $$Na_2CO_3.7H_2O$$

from solution is 192.5 B. t. u. per pound of sodium carbonate crystallized as heptahydrate. In the direct conversion of decahydrate crystals to heptahydrate crystals therefore, the net result is that 273.3 B. t. u. of heat is absorbed by the dissolving of the decahydrate, and only 192.5 B. t. u. evolved by the crystallization of the heptahydrate, making an actual absorption of heat in the whole operation of 80.8 B. t. u. per pound of $Na_2CO_3$ crystallized. If therefore the crystallizing vessel is well insulated, the necessary cooling to bring down to 18°-20° C. is taken care of by this heat of absorption without other means of cooling, as more than half a ton of refrigeration per ton of sodium carbonate crystallized is thus available for cooling from the reaction itself.

By continued exposure of the bed of decahydrate in the storage vats to the dry air of the Owens Valley climate, especially in the hot summer months, a layer of sodium carbonate monohydrate will be formed on the surface of the bed by efflorescence of the decahydrate. It has been found that this layer of monohydrate, being in the form of extremely fine crystals, acts more or less as an insulating medium and thus prevents the bed of decahydrate from melting in the hot weather. The decahydrate as taken to the plant may therefore contain some monohydrate. It is obvious that somewhat the same conditions apply at the transition point of heptahydrate to monohydrate as at the transition point of decahydrate to heptahydrate, i. e. at temperatures just below 23.6° C. in saturated sodium chloride solutions, monohydrate in the metastable extension of its solubility curve is more soluble than the heptahydrate at the same temperature. If therefore monohydrate is present, this will dissolve in the brine used as the suspending medium, and immediately crystallize out as the less soluble heptahydrate. The only difference will be that less sodium chloride will be required to be added to maintain saturation of this constituent in the mother liquor than in the case of decahydrate containing no monohydrate. If the mixture of decahydrate and monohydrate to be transformed to heptahydrate approximates the composition of heptahydrate in reference to the amount of water in the mixture, it will not be necessary to add any additional sodium chloride to maintain saturation of NaCl in the mother liquor, and should the amount of water in the decahydrate-monohydrate mixture be less than that required for the heptahydrate, or should the mixture be mostly monohydrate, there will be a concentration of sodium chloride in the mother liquor due to the abstraction of water in crystal form from the mixture to form the heptahydrate, and water will have to be added in sufficient amount to prevent sodium chloride crystallizing out with the heptahydrate.

Another way to avoid adding solid sodium chloride to the suspension of decahydrate and brine in the re-crystallization to heptahydrate is by drying the crude decahydrate before re-crystallization sufficiently to remove all of the mechanical water present and also the equivalent of approximately three molecules of the water of crystallization in the crystals, so that the amount of water it contains will approximate the amount of water in the heptahydrate. Such partial drying may be readily carried out in practice at Owens Lake on account of the low humidity air prevailing in this desert climate. Slightly warmed air would be passed over a layer of crude decahydrate below its melting point, when efflorescence takes place very rapidly.

If the supply of crude sodium carbonate decahydrate in the storage vats becomes contaminated with wind blown sand or dust from occasional sand storms, it will be necessary to remove this sand or material insoluble in water before proceeding with the conversion to heptahydrate. This may readily be done by heating the crude decahydrate to a temperature of 32° C. so as to melt the crystals in their own water of crystallization and adding enough water to dissolve any monohydrate that separates out in the melted mixture. The water-insoluble material is then separated from the strong sodium carbonate solution by settling or filtering. This clear strong sodium carbonate solution, which may contain from 28% to 31% Na₂CO₃, is then added to the suspending brine in the same proportion as in the example when using the solid decahydrate, with the addition of sufficient solid sodium chloride to maintain saturation of the mother liquor in this constituent, the temperature of the brine being maintained within the limits specified by suitable refrigerating means, and by adding the strong sodium carbonate solution at a slow enough rate to keep the temperature of the mixture under full control, this resulting in the conversion of the carbonate into pure heptahydrate crystals. In this case the full amount of the heat of crystallization of the heptahydrate must be taken care of in the cooling. This may be avoided by taking advantage of the fact that the melting or solidifying point of about 32° C. of decahydrate is well within the range of temperature to which cooling may be obtained with ordinary cooling water in the plant. In this case the clear settled strong sodium carbonate solution is placed in a suitable crystallizer provided with agitator and cooling coils for ordinary cooling water, and allowed to solidify into a mass of decahydrate crystals, which are then added direct to the suspending brine under the same conditions as in the illustration given.

A strong sodium carbonate solution containing up to 31% Na₂CO₃ in the proportions already given, can be used for the heptahydrate crystallization independently of whether this solution is derived from decahydrate by melting or by treating any other source of sodium carbonate in a raw material by dissolving it in water to maximum strength.

Another raw material available on Owens Lake containing sodium carbonate to which the principles of this invention may be applied to recover a pure sodium carbonate, is the trona deposit which may be harvested from the marginal portions of the lake, and which may have the following composition,

|  | Per cent |
|---|---|
| Na₂CO₃ | 40.5 |
| NaHCO₃ | 32.2 |
| Na₂B₄O₇ | .7 |
| NaCl | 2.6 |
| Na₂SO₄ | 1.7 |
| Sand and insoluble matter | 6.3 |
| H₂O of crystallization and moisture | 16.0 |
|  | 100.0 |

This may be calcined to decompose the sodium bicarbonate to the normal sodium carbonate and to drive off the water of crystallization and moisture. The calcined trona is then treated with just sufficient water to make a solution of maximum strength in sodium carbonate at a temperature around 32° C., which solution is freed from insoluble suspended matter by settling or filtration. This clear strong sodium carbonate solution, which may test 28% Na₂CO₃ or more, is added to the suspending brine in the same proportion and under the same conditions of temperature limits and maintenance of saturation in sodium chloride as already given. Or if cheap burned lime is available, as it is in the Owens Lake region from the huge waste piles of burned lime of plants which have used the carbonation process in the past, the raw trona as harvested may be ground to a size small enough to react readily and treated with enough water and caustic lime to convert the sodium bicarbonate content of the trona to the normal carbonate according to the equation:

$$2NaHCO_3 + CaO = Na_2CO_3 + CaCO_3 + H_2O$$

The water used for this operation is kept down to the minimum amount necessary to give a solution of sodium carbonate from 28% to 31% Na₂CO₃ after filtering off the calcium carbonate formed and other insoluble matter, which solution is converted to heptahydrate crystals as in the example heretofore given.

It is evident from Figures 1 and 2 of the drawings that the effect of saturating a sodium carbonate brine with sodium chloride is to widen the temperature range of the stable field of sodium carbonate heptahydrate and also to lower the transition temperatures of the hydrates of sodium carbonate. The practical advantages thus gained by saturating the carbonate brine with sodium chloride can be realized to a lesser degree by using quantities of sodium chloride less than that required for saturation. In this case the transition temperatures of the hydrates of sodium carbonate would be intermediate between those shown on Figures 1 and 2 of the drawings and would be dependent between these limits on the particular concentration of sodium chloride in the solution, but a brine having a substantial concentration of sodium chloride but less than saturation would facilitate the operation of transforming crude decahydrate crystals to pure heptahydrate crystals in the manner hereinbefore described.

I claim:

1. The method of purifying sodium carbonate decahydrate containing crystallized sodium sulphate, which consists in suspending a large excess of such decahydrate in a brine substantially saturated with sodium carbonate and sodium chloride, the sulphate content of the decahydrate thus suspended being such that the concentration of the final mother liquor in this constituent will not exceed 6% Na₂SO₄, adding to the mixture an amount of solid sodium chloride as will just saturate the water of hydration released by transformation of the decahydrate to heptahydrate and thus maintain saturation of the mother liquor in NaCl but not in excess thereof, agitating this suspension at a temperature between 18° and 24° centigrade, thereby transforming all of the sodium carbonate decahydrate in suspension into crystals of pure sodium carbonate heptahydrate, thus releasing the sodium sulphate crystallized with the decahydrate to the mother liquor, and then separating from the mother liquor the pure sodium carbonate heptahydrate crystals free from crystallized sodium sulphate or any other crystallized impurities with a high recovery of the sodium carbonate heptahydrate from the decahydrate.

2. The method of purifying sodium carbonate decahydrate containing crystallized sodium sulphate, which consists in suspending a large excess of such decahydrate in a brine substantially saturated with sodium carbonate, which brine is also within a few percent of saturation with respect to sodium chloride, the sulphate content of the decahydrate thus suspended being such that Glauber's salt, $Na_2SO_4.10H_2O$, will not crystallize out in the final mother liquor at the temperature employed, agitating this suspension at a temperature within the stable field of sodium carbonate heptahydrate for the particular concentration of sodium chloride employed, thereby transforming all of the sodium carbonate decahydrate into crystals of pure sodium carbonate heptahydrate, thus releasing the sulphate crystallized with the decahydrate to the mother liquor, and then separating from the mother liquor the pure sodium carbonate heptahydrate crystals.

3. The method of purifying sodium carbonate decahydrate containing crystallized sodium sulphate, which consists in adding a large excess of such decahydrate to a brine saturated with sodium carbonate and with sodium chloride, agitating the mixture at a temperature between 18° and 24° centigrade until all of the decahydrate therein is transformed to sodium carbonate heptahydrate, and then separating from the mother liquor the crystallized heptahydrate therein.

4. The method of purifying sodium carbonate decahydrate containing crystallized sodium sulphate, which consists in adding a large excess of such decahydrate to a brine saturated with sodium carbonate and with sodium chloride, agitating the mixture at a temperature between 18° and 24° centigrade until all of the decahydrate therein is transformed to sodium carbonate heptahydrate, maintaining a substantial saturation of sodium chloride in the solution during such transformation, and then separating from the mother liquor the crystallized heptahydrate therein.

5. A method of purifying crude sodium carbonate containing sodium sulphate, which consists in adding a large excess of crude sodium carbonate other than the heptahydrate to a brine saturated with sodium carbonate and with sodium chloride, adjusting the sodium chloride content of the solution to maintain substantial saturation of the mother liquor in sodium chloride when all of the added sodium carbonate has been changed into heptahydrate, agitating said mixture at a temperature between 18° and 24° centigrade until all of the added sodium carbonate has been transformed into a high yield of pure heptahydrate crystals and separating from the mother liquor the crystallized heptahydrate therein.

ALEXIS C. HOUGHTON.